United States Patent [19]

Goode et al.

[11] Patent Number: 4,803,251
[45] Date of Patent: Feb. 7, 1989

[54] METHOD FOR REDUCING SHEETING DURING POLYMERIZATION OF ALPHA-OLEFINS

[75] Inventors: Mark G. Goode, St. Albans; Daniel M. Hasenberg; Thomas J. McNeil, both of Hurricane; Thomas E. Spriggs, Cross Lanes, all of W. Va.

[73] Assignee: Union Carbide Corporation, Danbury, Conn.

[21] Appl. No.: 116,538

[22] Filed: Nov. 4, 1987

[51] Int. Cl.$^4$ .......................... C08F 2/00; C08F 2/34; C08F 2/38

[52] U.S. Cl. ........................................ 526/59; 526/62; 526/74; 526/78; 585/524

[58] Field of Search ................ 526/74, 62, 59, 78; 585/524

[56] References Cited

U.S. PATENT DOCUMENTS 4,532,311  7/1985  Fulks ..................................... 526/62

FOREIGN PATENT DOCUMENTS

| 589792 | 12/1959 | Canada ..................................... 526/74 |
| 0008799 | 3/1980 | European Pat. Off. . |
| 38-1597 | 2/1963 | Japan ..................................... 526/74 |
| 50-69605 | 11/1975 | Japan ..................................... 526/74 |
| 6000806 | 1/1981 | Japan ..................................... 526/74 |
| 4608 | 1/1981 | Japan . |
| 869137 | 5/1961 | United Kingdom ................ 526/74 |
| 871292 | 6/1961 | United Kingdom ................ 526/74 |

OTHER PUBLICATIONS

Geldard and Boland, "Electrostatic Charging in Gas Fluidization Beds", Power Technology, 5 (1971–72).
"Reduction of Particle Agglomeration in a Fluidizing Gas Stream in the Presence of a Radiofrequency Glow Discharge", I&EG Fund, 1980, 19, 315–316.
Geldart, Boland & Al-Salim, "Static Electrification in Fluidized Beds", Chem. Eng. Sci., 1969, vol. 24, pp. 1389–1390.
Pohl, H. A., "Nonuniform Field Effects: Dielectrophoresis", Chapter 14, Electrostatics and Its Application, Moore, Wiley, Pub. 1973.
Masuda, Komatsu, Mitsui and Iinoya, "Electrification of Gas Solid Suspensions Flowing in Steel and Insulating-Cooled Pipes", Journal of Electrostatics 2 (1976/1977), 341–350.

*Primary Examiner*—Asok Pal
*Attorney, Agent, or Firm*—Clement J. Vicari

[57] ABSTRACT

A method for reducing sheeting during polymerization of alpha-olefins by feeding either a positive charge generating or negative charge generating chemical additive to the reactor responsive to particular static levels in the reactor. The chemical additive is added in amounts which neutralize the charges in the reactor.

12 Claims, 1 Drawing Sheet

METHOD FOR REDUCING SHEETING DURING POLYMERIZATION OF ALPHA-OLEFINS

BACKGROUND OF THE INVENTION

Field of the Invention

This invention relates to a method for reducing sheeting during polymerization of alpha olefins and more particularly to a method for reducing sheeting during polymerization of polyethylene.

Summary of the Prior Art

Conventional low density polyethylene has been historically polymerized in heavy walled autoclaves or tubular reactors at pressures as high as 50,000 psi and temperatures up to 300° C. or higher. The molecular structure of high pressure, low density polyethylene (HP-LDPE) is highly complex. The permutations in the arrangement of their simple building blocks are essentially infinite. HP-LDPE's are characterized by an intricate long chain branched molecular architecture. These long chain branches have a dramatic effect on the melt rheology of these resins. HP-LDPE's also possess a spectrum of short chain branches, generally 1 to 6 carbon atoms in length. These short chain branches disrupt crystal formation and depress resin density.

More recently, technology has been provided whereby low density polyethylene can be produced by fluidized bed techniques at low pressures and temperatures by copolymerizing ethylene with various alpha-olefins. These low pressure LDPE (LP-LDPE) resins generally possess little, if any, long chain branching and are sometimes referred to as linear LDPE resins. They are short chain branched with branch length and frequency controlled by the type and amount of comonomer used during polymerization.

As is well known to those skilled in the art, low pressure, high or low density polyethylenes can now be conventionally provided by a fluidized bed process utilizing several families of catalysts to produce a full range of low density and high density products. The appropriate selection of catalysts to be utilized depends in part upon the type of end product desired, i.e., high density, low density, extrusion grade, film grade resins and other criteria.

The various types of catalysts which may be used to produce polyethylenes in fluid bed reactors can generally be typed as follows:

Type I. The silyl chromate catalysts disclosed in U.S. Pat. No. 3,324,101 to Baker and Carrick and U.S. Pat. No. 3,324,095 to Carrick, Karapinks and Turbet. The silyl chromate catalysts are characterized by the presence therein of a group of the formula:

wherein R is a hydrocarbyl group having from 1 to 14 carbon atoms. The preferred silyl chromate catalysts are the bis(triarylsilyl) chromates and more preferably bis(triphenylsilyl) chromate.

This catalyst is used on a support such as silica, alumina, thoria, zirconia and the like, other supports such as carbon black, micro-crystalline cellulose, the non-sulfonated ion exchange resins and the like may be used.

Type II. The bis(cyclopentadienyl) chromium (II) compounds disclosed in U.S. Pat. No. 3,879,368. These bis(cyclopentadienyl) chromium (II) compounds have the following formula:

wherein R' and R" may be the same or different $C_1$ to $C_2$, inclusive, hydrocarbon radicals, and n' and n" may be the same or different integers of 0 to 5, inclusive. The R' and R" hydrocarbon radicals may be saturated or unsaturated, and can include aliphatic, alicyclic and aromatic radicals such as methyl, ethyl, propyl, butyl, pentyl, cyclopentyl, cyclohexyl, allyl, phenyl and naphthyl radicals.

These catalysts are used on a support as heretofore described.

Type III. The catalysts as described in U.S. Pat. No. 4,011,382. These catalysts contain chromium and titanium in the form of oxides and, optionally, fluorine and a support. The catalysts contain, based on the combined weight of the support and the chromium, titanium and fluorine, about 0.05 to 3.0, and preferably about 0.2 to 1.0, weight percent of chromium (calculated as Cr), about 1.5 to 9.0, and preferably about 4.0 to 7.0, weight percent of titanium (calculated as Ti), and 0.0 to about 2.5, and preferably about 0.1 to 1.0 weight percent of fluorine (calculated as F).

The chromium compounds which may be used for the Type III catalysts include $CrO_3$, or any compound of chromium which is oxidizable to $CrO_3$ under the activation conditions employed. At least a portion of the chromium in the supported, activated catalyst must be in the hexavalent state. Chromium compounds other than $CrO_3$ which may be used are disclosed in U.S. Pat. No. 2,825,721 and U.S. Pat. No. 3,622,521 and include chromic acetyl acetonate, chromic nitrate, chromic acetate, chromic chloride, chromic sulfate, and ammonium chromate.

The titanium compounds which may be used include all those which are oxidizable to $TiO_2$ under the activation conditions employed, and include those disclosed in U.S. Pat. No. 3,622,521 and Netherlands Patent Application No. 72-10881.

The fluorine compounds which may be used include HF, or any compound of fluorine which will yield HF under the activation conditions employed. Fluorine compounds other than HF which may be used are disclosed in Netherlands Patent Application No. 72-10881.

The inorganic oxide materials which may be used as a support in the catalyst compositions are porous materials having a high surface area, that is, a surface area in the range of about 50 to 1000 square meters per gram, and an average particle size of about 20 to 200 microns. The inorganic oxides which may be used include silica, alumina, thoria, zirconia and other comparable inorganic oxides, as well as mixtures of such oxides.

Type IV. The catalysts as described in U.S. Pat. No. 4,302,566 in the names of F. J. Karol et al, and entitled, "Preparation of Ethylene Copolymers in Fluid Bed Reactor" and assigned to the same assignee as the present application. These catalysts comprise at least one titanium compound, at least one magnesium compound, at least one electron donor compound, at least one activator compound and at least one inert carrier material.

The titanium compound has the structure $$Ti(OR)_a X_b$$

wherein R is a $C_1$ to $C_{14}$ aliphatic or aromatic hydrocarbon radical, or COR' where R' is a $C_1$ to $C_{14}$ aliphatic or aromatic hydrocarbon radical; X is Cl, Br, or I; a is 0 or 1; b is 2 to 4 inclusive; and a+b=3 or 4.

The titanium compounds can be used individually or in combination thereof, and would include $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

The magnesium compound has the structure:

$$MgX_2$$

wherein X is Cl, Br, or I. Such magnesium compounds can be used individually or in combinations thereof and would include $MgCl_2$, $MgBr_2$ and $MgI_2$. Anhydrous $MgCl_2$ is the preferred magnesium compound.

The titanium compound and the magnesium compound are generally used in a form which will facilitate their dissolution in the electron donor compound.

The electron donor compound is an organic compound which is liquid at 25° C. and in which the titanium compound and the magnesium compound are partially or completely soluble. The electron donor compounds are known as such or as Lewis bases.

The electron donor compounds would include such compounds as alkyl esters of aliphatic and aromatic carboxylic acids, aliphatic ethers, cyclic ethers and aliphatic ketones.

The catalyst may be modified with a boron halide compound having the structure:

$$BR_c X'_{3-c}$$

wherein R is an aliphatic or aromatic hydrocarbon radical containing from 1 to 14 carbon atoms or OR', wherein R' is also an aliphatic or aromatic hydrocarbon radical containing from 1 to 14 carbon atoms; X' is selected from the group consisting of Cl and Br, or mixtures thereof, and; c is 0 or 1 when R is an aliphatic or aromatic hydrocarbon and 0, 1 or 2 when R is OR'.

The boron halide compounds can be used individually or in combination thereof, and would include $BCl_3$, $BBr_3$, $B(C_2H_5)Cl_2$, $B(OC_2H_5)Cl_2$, $B(OC_2H_5)_2Cl$, $B(C_6H_5)Cl_2$, $B(OC_6H_5)Cl_2$, $B(C_6H_{13})Cl_2$, $B(OC_6H_{13})Cl_2$, and $B(OC_6H_5)_2Cl$. Boron trichloride is the particularly preferred boron compound.

The activator compound has the structure:

$$Al(R'')_c X'_d H_e$$

wherein X' is Cl or $OR_1$; $R_1$ and R'' are the same or different and are $C_1$ to $C_{14}$ saturated hydrocarbon radicals, d is 0 to 1.5, e is 1 or 0, and c+d+e=3.

Such activator compounds can be used individually or in combinations thereof.

The carrier materials are solid, particulate materials and would include inorganic materials such as oxides of silicon and aluminum and molecular sieves, and organic materials such as olefin polymers, e.g., polyethylene.

Type V. Vanadium based catalysts. These type catalysts generally include vanadium as the active ingredient, one such type catalyst generally comprises a supported precursor, a cocatalyst and a promoter. The supported precursor consists essentially of a vanadium compound and modifier impregnated on a solid, inert carrier. The vanadium compound in the precursor is the reaction product of a vanadium trihalide and an electron donor. The halogen in the vanadium trihalide is chlorine, bromine or iodine, or mixtures thereof. A particularly preferred vanadium trihalide is vanadium trichloride, $VCl_3$.

The electron donor is a liquid, organic Lewis base in which the vanadium trihalide is soluble. The electron donor is selected from the group consisting of alkyl esters of aliphatic and aromatic carboxylic acids, aliphatic esters, aliphatic ketones, aliphatic amines, aliphatic alcohols, alkyl and cycloalkyl ethers, and mixtures thereof. Preferred electron donors are alkyl and cycloalkyl ethers, including particularly tetrahydrofuran. Between about 1 to about 20, preferably between about 1 to about 10, and most preferably about 3 moles of the electron donor are complexed with each mole of vanadium used.

The modifier used in the precursor has the formula:

$$MX_a$$

wherein:
M is either boron or $AlR_{(3-a)}$ and wherein each R is independently alkyl, provided that the total number of aliphatic carbon atoms in any one R group may not exceed 14;
X is chlorine, bromine or iodine; and
a is 0, 1 or 2, with the provision that when M is boron a is 3.

Preferred modifiers include $C_1$ to $C_6$ alkyl aluminum mono and di- chlorides and boron trichloride. A particularly preferred modifier is diethyl aluminum chloride. About 0.1 to about 10, and preferably about 0.2 to about 2.5, moles of modifier are used per mole of electron donor.

The carrier is a solid, particulate porous material inert to the polymerization. The carrier consists essentially of silica or alumina, i.e., oxides of silicon or aluminum or mixtures thereof. Optionally, the carrier may contain additional materials such as zirconia, thoria or other chemically inert to the polymerization or mixtures thereof.

The carrier is used as a dry powder having an average particle size of between about 10 to about 250, preferably about 20 to about 200, and most preferably about 30 to about 100, microns. The porous carrier has a surface area of greater than or equal to about 3, and preferably greater than or equal to about 50, $m^2/g$. A preferred carrier is silica having pore sizes of greater than or equal to about 80, and preferably greater than or equal to about 100, angstroms. The carrier is predried by heating to remove water, preferably at a temperature of greater than or equal to about 600° C.

The amount of carrier used is that which will provide a vanadium content of between about 0.05 to about 0.5 mmoles of vanadium per gram (mmole V/g), and preferably between about 0.2 to about 0.35 mmole V/g, and most preferably about 0.29 mmole V/g.

The carrier is ordinarily free of preparative chemical treatment by reaction with an alkylaluminum compound prior to the formation of the supported precursor. Such treatment results in the formation of aluminum alkoxides chemically bonded to the carrier molecules. It has been discovered that the use of such a treated carrier in the catalyst composition and process is not only nonessential, but instead results in undesirable agglomeration when used in the preparation of high density polyethylene (>0.94 g/cc), resulting in a chunk-like, non-freely flowing product.

The cocatalyst which can be employed for the Type IV and Type V catalysts has the formula:

$$AlR_3$$

wherein R is as previously defined in the definition of M. Preferred cocatalysts include $C_2$ to $C_8$ trialkylaluminum compounds. A particularly preferred cocatalyst is triisobutyl aluminum. Between about 5 to about 500, and preferably between about 10 to about 50, moles of cocatalyst are used per mole of vanadium.

The promoter has the formula:

$$R'_b CX'_{(4-b)}$$

wherein:
R' is hydrogen or unsubstituted or halosubstituted lower, i.e., up to about $C_6$ containing, alkyl;
X' is halogen; and
b is 0, 1 or 2.

Between about 0.1 to about 10, and preferably between about 0.2 to about 2, moles of promoter are used per mole of cocatalyst.

The catalyst is produced by first preparing the supported precursor. In one embodiment, the vanadium compound is prepared by dissolving the vanadium trihalide in the electron donor at a temperature between about 20° C. up to the boiling point of the electron donor for a few hours. Preferably, mixing occurs at about 65° C. for about 3 hours or more. The vanadium compound so produced is then impregnated onto the carrier. Impregnation may be effected by adding the carrier as a dry powder or as a slurry in the electron donor or other inert solvent. The liquid is removed by drying at less than about 100° C. for a few hours, preferably between about 45° to about 90° C. for about 3 to 6 hours. The modifier, dissolved in an inert solvent, such as a hydrocarbon, is then mixed with the vanadium impregnated carrier. The liquid is removed by drying at temperatures of less than about 70° C. for a few hours, preferably between about 45° to about 65° C. for about 3 hours.

The cocatalyst and promoter are added to the supported precursor either before and/or during the polymerization reaction. The cocatalyst and promoter are added either together or separately, and either simultaneously or sequentially during polymerization. The cocatalyst and promoter are preferably added separately as solutions in inert solvent, such as isopentane, during polymerization.

In general, the above catalysts are introduced together with the polymerizable materials, into a reactor having an expanded section above a straight sided section. Cycle gas enters the bottom of the reactor and passes upward through a gas distributor plate into a fluidized bed located in the straight sided section of the vessel. The gas distributor plate serves to ensure proper gas distribution and to support the resin bed when gas flow is stopped.

Gas leaving the fluidized bed entrains resin particles. Most of these particles are disengaged as the gas passes through the expanded section where its velocity is reduced.

In order to satisfy certain end use applications for ethylene resins, such as for film, injection molding and roto molding applications, catalyst Types IV and V with alkyl aluminum cocatalysts have been used. However, attempts to produce certain ethylene resins utilizing alkyl aluminum cocatalysts with the Type IV and V catalysts supported on a porous silica substrate in certain fluid bed reactors, have not been entirely satisfactory from a practical commercial standpoint. This is primarily due to the formation of "sheets" in the reactor after a period of operation. The "sheets" can be characterized as constituting a fused polymeric material.

It has been found that a static mechanism is a contributor to the sheeting phenomena whereby catalyst and resin particles adhere to the reactor walls due to static forces. If allowed to reside long enough under a reactive environment, excess temperatures can result in particle fusion. Numerous causes for static charge exist. Among them are generation due to frictional electrification of dissimilar materials, limited static dissipation, introduction to the process of minute quantities of prostatic agents, excessive catalyst activities, etc. Strong correlation exists between sheeting and the presence of excess static charges either negative or positive. This is evidenced by sudden changes in static levels followed closely by deviation in temperatures at the reactor wall. These temperature deviations are either high or low. Low temperatures indicate particle adhesion causing an insulating effect from the bed temperature. High deviations indicate reaction taking place in zones of limited heat transfer. Following this, disruption in fluidization patterns is generally evident, catalyst feed interruption can occur, product discharge system pluggage results, and thin fused agglomerates (sheets) are noticed in the granular product.

The sheets vary widely in size, but are similar in most respects. They are usually about ¼ to ½ inch thick and are from about one to five feet long, with a few specimens even longer. They have a width of about 3 inches to more than 18 inches. The sheets have a core composed of fused polymer which is oriented in the long direction of the sheets and their surfaces are covered with granular resin which has fused to the core. The edges of the sheets can have a hairy appearance from strands of fused polymer.

It is therefore an object of the present invention to provide a method for substantially reducing or eliminating the amount of sheeting which occurs during the low pressure fluidized bed polymerization of alpha-olefins utilizing titanium based compounds or vanadium based compounds as catalyst with alkyl aluminum as cocatalysts.

Figure 1:
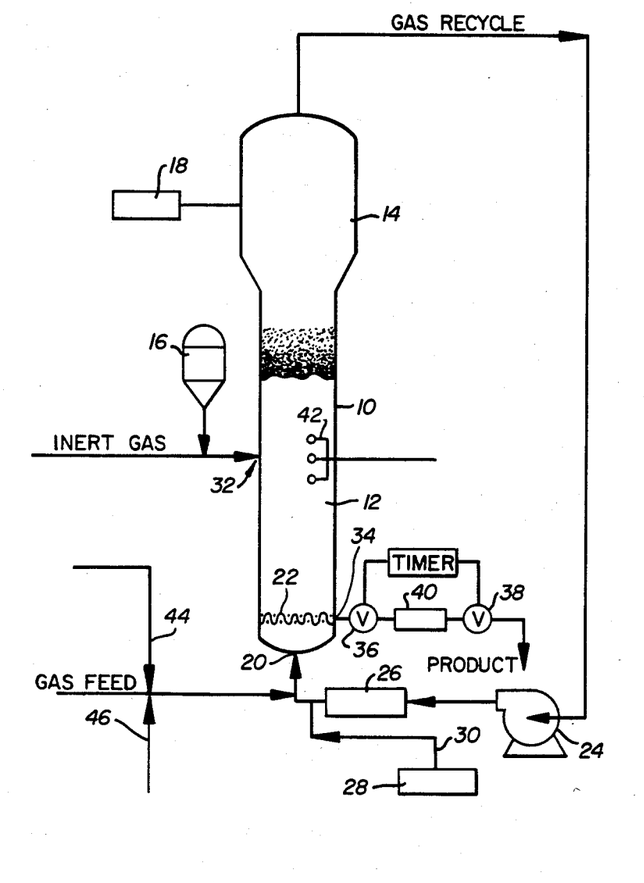

These and other objects will become readily apparent from the following description taken in conjunction with the accompanying drawing which generally indicates a typical gas phase fluidized bed polymerization process for producing high density and low density polyolefins slightly modified to reflect the present invention.

SUMMARY OF THE INVENTION

Broadly contemplated, the present invention provides a method for reducing sheeting during polymerization of alpha-olefins in a low pressure fluidized bed reactor utilizing titanium or vanadium based compounds as catalysts together with alkyl aluminum cocatalysts which comprises determining the electrostatic levels at the site of possible sheet formations in said reactor; if negative electrostatic levels are indicated then adding a positive charge generating chemical additive to the reactor said additive being selected from the group consisting of alcohols containing up to 7 carbon atoms, oxygen and nitric oxide; if positive electrostatic levels are indicated in said reactor then, adding a negative charge generating chemical additive to the reactor said chemical additive being a ketone containing up to 7 carbon atoms, said positive or negative charge generating chemical additive being added to said reactor as required in an amount sufficient to create and maintain neutral static charges in said reactor.

BRIEF DESCRIPTION OF THE DRAWING

The sole figure of the drawing is a schematic representation of the process of the invention.

DESCRIPTION OF THE PREFERRED EMBODIMENTS

The amount and type of chemical additive which is added to the reactor depends on the static voltage within the reactor and can generally range in an amount of from about 0.1 to about 25 ppm based on monomer (preferably ethylene) feed.

The critical static voltage level for sheet formation is a complex function of resin sintering temperature, operating temperature, drag forces in the fluid bed, resin particle size distribution and recycle gas composition. The static voltage can be reduced by a variety of conventional techniques such as by treating the reactor surface to reduce static electric generation by injection of an antistatic agent to increase particle surface electrical conductivity thus promoting particle discharging; by installation of appropriate devices connected to the reactor walls which are designed to promote electrical discharging by creating areas of high localized field strength, and by neutralization of charges by the injection or creation of ion pairs, ions or charged particles of the opposite polarity from the resin bed.

According to the present invention, the use of the particular type of chemical additive to the gas phased low pressure polyethylene process will assist in the reduction of agglomerate formation in the fluidized bed. This is accomplished by a reduction in the levels of positive or negative static voltage depending on the type of additive, which lowers particle adhesive forces in the reaction system.

Referring particularly to the sole figure of the drawing, a conventional fluidized bed reaction system for polymerizing alpha-olefins includes a reactor 10 which consists of a reaction zone 12 and a velocity reduction zone 14.

The reaction zone 12 includes a bed of growing polymer particles, formed polymer particles and a minor amount of catalyst particles fluidized by the continuous flow of polymerizable and modifying gaseous components in the form of make up feed and recycle gas through the reaction zone. To maintain a viable fluidized bed, the mass gas flow rate through the bed is normally maintained above the minimum flow required for fluidization, and preferably from about 1.5 to about 10 times $G_{mf}$ and more preferably from about 3 to about 6 times $G_{mf}$. $G_{mf}$ is used in the accepted form as the abbreviation for the minimum gas flow required to achieve fluidization, C. Y. Wen and Y. H. Yu, "Mechanics of Fluidization", Chemical Engineering Progress Symposium Series, Vol. 62, pg. 100–111 (1966).

It is highly desirable that the bed always contains particles to prevent the formation of localized "hot spots" and to entrap and distribute the particulate catalyst throughout the reaction zone. On start up, the reactor is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start up bed.

The appropriate catalyst used in the fluidized bed is preferably stored for service in a reservoir 16 under a blanket of a gas which is inert to the stored material, such as nitrogen or argon.

Fluidization is achieved by a high rate of gas recycle to and through the bed, typically in the order of about 50 times the rate of feed of make up gas. The fluidized bed has the general appearance of a dense mass of viable particles in possible free vortex flow as created by the percolation of gas through the bed. The pressure drop through the bed is equal to or slightly greater than the mass of the bed divided by the cross sectional area. It is thus dependent on the geometry of the reactor.

Make-up gas is fed to the bed at a rate equal to the rate at which particulate polymer product is withdrawn. The composition of the make up gas is determined by a gas analyzer 18 positioned above the bed. The gas analyzer determines the composition of the gas being recycled and the composition of the make up gas is adjusted accordingly to maintain an essentially steady state gaseous composition within the reaction zone.

To insure complete fluidization, the recycle gas and, where desired, part or all of the make-up gas are returned to the reactor at base 20 below the bed. Gas distribution plate 22 positioned above the point of return ensures proper gas distribution and also supports the resin bed when gas flow is stopped.

The portion of the gas stream which does not react in the bed constitutes the recycle gas which is removed from the polymerization zone, preferably by passing it into velocity reduction zone 14 above the bed where entrained particles are given an opportunity to drop back into the bed.

The recycle gas is then compressed in a compressor 24 and thereafter passed through a heat exchanger 26 wherein it is stripped of heat of reaction before it is returned to the bed. By constantly removing heat of reaction, no noticeable temperature gradient appears to exist within the upper portion of the bed. A temperature gradient will exist in the bottom of the bed in a layer of about 6 to 12 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed thereby maintaining itself at an essentially constant temperature under steady conditions. The recycle is then returned to the reactor at its base 20 and to the fluidized bed through distribution plate 22. The compressor 24 can also be placed downstream of heat exchanger 26.

Hydrogen may be used as a chain transfer agent for conventional polymerization reactions of the types contemplated herein. In the case where ethylene is used as a monomer the ratio of hydrogen/ethylene employed will vary between 0 to about 2.0 moles of hydrogen per mole of the monomer in the gas stream.

Any gas inert to the catalyst and reactants can also be present in the gas stream. The cocatalyst is added to the gas recycle stream upstream of its connection with the reactor as from dispenser 28 through line 30.

As is well known, it is essential to operate the fluid bed reactor at a temperature below the sintering temperature of the polymer particles. Thus to insure that sintering will not occur, operating temperatures below sintering temperature are desired. For the production of ethylene polymers, an operating temperature of from about 80° to 110° C. is preferably used to prepare products having a density of about 0.94 to 0.97 while a temperature of about 75° to 95° C. is preferred for products having a density of about 0.91 to 0.94.

The fluid bed reactor is operated at total pressures of up to about 270–350 psi.

The catalyst is injected into the bed at a rate equal to its consumption at a point 32 which is above the distribution plate 22. A gas which is inert to the catalyst such as nitrogen or argon is used to carry the catalyst into the bed. Injecting the catalyst at a point above distribution plate 22 is an important feature. Since the catalysts normally used are highly active, injection into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots".

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity The particulate polymer product is preferably withdrawn at a point 34 at or close to distribution plate 22. The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone and after delivery, valve 38 is then closed to await the next product recovery operation.

Finally, the fluidized bed reactor is equipped with an adequate venting system to allow venting the bed during the start up and shut down. The reactor does not require the use of stirring means and/or wall scraping means.

The reactor vessel is normally constructed of carbon steel and is designed for the operating conditions stated above.

In order to better illustrate the problems incident to the utilization of the Type IV catalysts, reference is again made to the drawing. The titanium based catalyst (Type IV) is introduced into the reactor 10 at point 32. Under conventional operations on certain resins, after a period of time, sheets begin to form in reactor 10, at a site in the reactor proximate the wall of the reactor and located about a distance of one half the reactor diameter up from the base of the fluid bed. The sheets of fused resin begin to appear in segregation zone 40, rapidly plugging the system, causing the reactor to be shut down. More characteristically the sheeting begins after production equivalent to 6 to 10 times the weight of the bed of resin in reactor 10.

The causes for sheeting have been discussed extensively in U.S. Pat. No. 4,532,311 and according to the teachings in said patents, it is generally believed that when the charge on the particles reaches the level where the electrostatic forces trying to hold the charged particle near the reactor wall exceed the drag forces in the bed trying to move the particle away from the wall, a layer of catalyst containing, polymerizing resin particles forms a non fluidized layer near the reactor wall. Heat removal from this layer is not sufficient to remove the heat of polymerization because the non-fluidized layer near the wall has less contact with the fluidizing gas than do particles in the fluidized portion of the bed. The heat of polymerization increases the temperature of the non-fluidized layer near the reactor wall until the particles melt and fuse. At this point other particles from the fluidized bed will stick to the fused layer and it will grow in size until it comes loose from the reactor wall. The separation of a dielectric from a conductor (the sheet from the reactor wall) is known to generate additional static electricity thus accelerating subsequent sheet formation.

As discussed in U.S. Pat. No. 4,532,311, the art teaches various processes whereby static voltage can be reduced or eliminated. These comprise (1) reducing the rate of charge generation, (2) increasing the rate of discharge of electrical charge, and (3) neutralization of electrical charge. Some processes suited for use in a fluidized bed comprise (1) use of an additive to increase the conductivity of the particles thus providing a path for discharging, (2) installation of grounding devices in a fluidized bed to provide additional area for discharging electrostatic charges to ground, (3) ionization of gas or particles by electrical discharge to generate ions to neutralize electrostatic charges on the particles, and (4) the use of radioactive sources to produce radiation that will create ions to neutralize electrostatic charges on the particles. The application of these techniques to a commercial scale, fluidzzed bed, polymerization reactor may not be feasible or practical. Any additive used must not act as a poison to the polymerization catalyst and must not adversely affect the quality of the product.

As mentioned previously, we have discovered a group of chemical additives which generate either positive or negative charges in the reactor, depending on the type additive, and advantageously these additives are employed in amounts which do not significantly poison the polymerization catalyst nor adversely affect the quality of the products. We have further found that by carefully monitoring the electrostatic levels in the reactor, that the additives which generate either positive or negative charges can be added responsive to the charges in the reactor so as to maintain the electrostatic charges substantially at neutral levels thereby reducing or avoiding sheeting.

The chemical additives contemplated for use in the present invention are as explained previously those which generate positive charges in the reactor and are selected from the group consisting of alcohols containing up to 7 carbon atoms, oxygen and nitric oxide or those which generate a negative charge in the reactor such as a ketone containing up to 7 carbon atoms preferably acetone and methyl isobutylketone. Of the positive generating charge chemical additive, the most preferred is methanol. Of the negative generating charge chemical additive, the most preferred is methyl isobutyl ketone.

Although as mentioned previously, amounts of positive or negative charge generating chemical additive in the range of about 0.1 to about 25 ppm based on monomer feed can be employed, it is preferred to employ amounts of chemical additive which generate sufficient positive or negative charges to neutralize negative or positive static charges, respectively.

Static voltage in the reactor can be monitored near the reactor wall by one or more static voltage indicators 42 inserted into the reactor bed approximately five feet above the distributor plate in the range of $-15,000$ to $+15,000$ volts. With reaction in progress, changes in static voltage levels from neutral to positive can be counteracted by feed of the negative charge generating chemical additive to the ethylene stream (gas feed) through line 44. Alternatively changes in static voltage levels from neutral to negative can be counteracted by feed of positive generating additive to the gas feed through line 46. If this is not performed, impending agglomerate formation will likely create a process upset. Care must be exercised to avoid excessive chemical additives which can result in unwanted static voltage levels.

The system is operated with various sensors, flow and check valves which are common in the art and hence not illustrated.

The polymers to which the present invention is primarily directed and which cause the sheeting problems above referred to in the presence of titanium or vanadium catalysts are linear homopolymers of ethylene or linear copolymers of a major mol percent ($\geqq 90\%$) of ethylene, and a minor mol percent ($\leqq 10\%$) of one or more $C_3$ to $C_8$ alpha olefins. The $C_3$ to $C_8$ alpha olefins should not contain any branching on any of their carbon atoms which is closer than the fourth carbon atom. The preferred $C_3$ to $C_8$ alpha olefins are propylene, butene-1, pentene-1, hexene-1, 4-methylpentene-1, heptene-1, and octene-1. This description is not intended to exclude the use of this invention with alpha olefin homopolymer and copolymer resins in which ethylene is not a monomer.

The homopolymers and copolymers have a density ranging from about 0.97 to 0.91. The density of the copolymer, at a given melt index level is primarily regulated by the amount of the $C_3$ to $C_8$ comonomer which is copolymerized with the ethylene. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions. In the absence of the comonomer, the ethylene would homopolymerize.

The melt index of a homopolymer or copolymer is a reflection of its molecular weight. Polymers having a relatively high molecular weight, have relatively high viscosities and low melt index.

In a typical mode of utilizing the subject invention to reduce sheeting, a reactor vessel such as shown in FIG. 1 and which is susceptible to sheeting problems by the polymerization of the above described materials utilizing Type IV and Type V catalysts with an alkyl aluminum cocatalyst is partially filled with granular polyethylene resin which is purged with a non reactive gas such as nitrogen and is fluidized by circulating said non-reacting gas through the reactor at a velocity above the minimum fluidizing velocity (Gmf) of the granular polyethylene and preferably at 3 to 5 Gmf. The reactor is brought up to operational temperatures by the gas and the reaction is started by introducing the catalyst and cocatalyst to the reactor. During reaction, static voltage levels may often approach those levels which cause sheeting. The voltage levels in the reactor are determined and monitored and chemical additive responsive to the type charge desired for neutralization is added to the gas feed stream through lines 44 or 46 and the procedure is continued until the static voltage levels are substantially neutralized.

Having set forth the general nature of the invention, the following examples illustrate some specific embodiments of the invention. It is to be understood, however, that this invention is not limited to the examples, since the invention may be practiced by the use of various modifications.

Examples 1 and 2 were conducted in a conventional bed reactor. The catalyst used was a Ziegler type, titanium based catalyst supported on porous silica produced as described earlier as Type IV. The cocatalyst used was triethyl aluminum. The products made in the examples were copolymers of ethylene and 1 butene. Hydrogen was used as a chain transfer agent to control the melt index of the polymer.

EXAMPLE 1

A fluidized bed reactor was started up at operating conditions designed to produce a film grade low density ethylene copolymer product having a density of 0.918, a melt index of 1.0, and a sticking temperature of 104° C. The reaction was started by feeding catalyst to the reactor precharged with a bed of granular resin similar to the product to be made. The catalyst was a mixture of 5.5 parts titanium tetrachloride, 8.5 parts magnesium chloride and 14 parts tetrahydrofuran deposited on 100 parts Davison grade 955 silica which had been dehydrated at 600° C. and treated with four parts triethylaluminum prior to deposition and was activated with thirty-five parts tri-n-hexyl aluminum subsequent to deposition. Prior to starting catalyst feed, the reactor and resin bed were brought up to the operating temperature of 85° C., were purged of impurities by circulating nitrogen through the resin bed. Ethylene, butene and hydrogen concentrations were established at 53, 24, and 11%, respectively. Cocatalyst was fed at a rate of 0.3 parts triethylaluminum per part of catalyst.

Reactor start-up was normal. After producing product for twenty-nine hours and equivalent to 6½ times the weight of the fluidized bed, temperature excursions of 1° to 2° C. above bed temperature were observed using thermocouples located just inside the reactor wall at an elevation of ½ reactor diameter above the gas distributor plate. Prior experience had shown that such temperature excursions are a positive indication that sheets of resin are being formed in the fluidized bed. Concurrently, bed voltage (measured using an electrostatic voltmeter connected to a ½ inch diameter spherical electrode located one inch from the reactor wall at an elevation of ½ reactor diameter above the gas distributor plate) increased from a reading of approximately $+1500$ to $+2000$ volts to a reading of over $+5000$ volts and then dropped back to +2000 volts over a 3 minute period. Temperature and voltage excursions continued for approximately 12 hours and increased in frequency and magnitude. During this period, sheets of fused polyethylene resin began to show up in the resin product. Evidence of sheeting became more severe, i.e., temperature excursions increased to as high as 20° C. above bed temperature and stayed high for extended periods of time and voltage excursions also became more frequent. The reactor was shut down because of the extent of sheeting.

EXAMPLE 2

The fluidized bed reactor used in Example 1 was started up and operated to produce a linear low density ethylene copolymer suitable for extrusion or rotational molding and having a density of 0.934, a melt index of 5 and a sticking temperature of 118° C. The reaction was started by feeding catalyst similar to the catalyst in Example 1 except activated with 28 parts tri-n-hexylaluminum, to the reactor precharged with a bed of granular resin similar to the product to be made. Prior to starting catalyst feed the reactor and the resin bed were brought up to the operating temperature of 85° C., and were purged of impurities with nitrogen. The concentration of ethylene (52%), butene (14%), hydrogen (21%) were introduced into the reactor. Cocatalyst triethylaluminum was fed at 0.3 parts per part of catalyst. The reactor was operated continuously for 48 hours and during that period produced resin equivalent to 9 times the amount of resin contained in the bed. After this 48 hour period of smooth operation, sheets of fused resin began to come out of the reactor with the normal, granular product. At this time voltages measured $\frac{1}{2}$ reactor diameter above the distributor plate averaged +2000 volts and ranged from 0 to +10,000 volts, while the skin thermocouples at the same elevation indicated excursions of >15° C. above the bed temperature. Two hours after the first sheets were noted in the product from the reactor, it was necessary to stop feeding catalyst and cocatalyst to the reactor to reduce the resin production rate because sheets were plugging the resin discharge system. One hour later, catalyst and cocatalyst feeds were restarted. The production of sheets continued and after two hours catalyst and cocatalyst feed were again stopped and the reaction was terminated by injecting carbon monoxide. The voltage at this time was > +12,000 volts and the thermocouple excursions continued until the poison was injected. In total, the reactor was operated for 53 hours and produced 10½ bed volumes of resin before the reaction was stopped due to sheeting.

The following Examples illustrate the prevention of sheeting by adding the chemical additive to the gas feed during periods of high voltage in the reactor.

EXAMPLE 3

Copolymerization of ethylene and butene was sustained in a fluidized bed reactor. The product copolymer was a film grade resin of 0.918 grams/cm$^3$ and a melt index of 1 dg/min. The catalyst consisted of a mixture of 5 parts TiCl$_3$·$\frac{1}{3}$AlCl$_3$, 7 parts MgCl$_2$, and 17 parts tetrahydrofuran deposited on 100 parts of Davison grade 955 silica. The silica had been dehydrated at 600° C. and treated with 5.7 parts triethylaluminum prior to disposition and activated with 32 parts tri-n-hexyl aluminum and 11 parts diethylaluminum chloride subsequent to disposition. The co catalyst triethylaluminum, was fed at a sufficient rate to maintain molar ratio of Al to Ti of 30 to 1. The fluidized bed was maintained at a temperature of 88° C. Concentrations of ethylene, butene, and hydrogen in the reactor were 46, 16, and 14 mole percent, respectively. Resin was periodically withdrawn from the reactor in order to maintain a constant fluidized bed height within the reactor. Catalyst was fed directly into the fluidized bed and all other feeds were introduced into the cycle gas stream downstream of both the compressor and heat exchanger.

Static voltage was measured in the fluidized bed by monitoring the voltage on a hemispherical steel probe located one inch from the inside wall, and one bed diameter above the distributor plate. The static voltage in the reactor was −500 volts.

A stream of nitrogen saturated with methanol was then fed to reactor recycle at a point just upstream of the bottom head of the reactor. The methanol addition started to drive the static voltage in the positive direction.

When the rate of methanol addition to the cycle was 0.4 ppm per part ethylene feed to the cycle, the static voltage was reduced to zero volts. When the rate of methanol addition was increased further to 0.9 ppm per part ethylene addition to the cycle, the static voltage rose to +600 volts. By properly adjusting the flow rate of methanol to the reactor in response to readings from the static probe, the voltage was maintained in the range of ±100 volts.

By operation in this manner, no sheets or chunks of fused resin appeared in the product resin withdrawn from the reactor. Care was taken to keep from adding too much methanol and thus driving the static voltage too far positively, Likewise, when the voltage started to drift more negatively, additional methanol was added to the reactor. It was found that there was no loss of catalyst productivity when methanol was added to the reactor to control negative static. Reactor operation was smooth with no indications of sheet formation when methanol was used to control negative static voltage.

EXAMPLE 4

A fluidized bed reactor was started up at operating conditions designed to produce a film grade low density ethylene copolymer product having a density of 0.918, a melt index of 1.0 dg/min, and a sticking temperature of 104° C. The reaction was started by feeding catalyst to the reactor precharged with a bed of granular resin similar to the product to be made. The catalyst was a mixture of 5 parts titanium trichloride, 1.7 parts aluminum chloride, 8 parts magnesium chloride, and 16 parts tetrahydrofuran deposited on 100 parts Davison grade 955 silica which had been dehydrated at 600° C. and treated with five parts triethylaluminum prior to deposition and was activated with thirty two parts tri-n-hexyl aluminum and twelve parts diethylaluminum chloride subsequent to deposition. Prior to starting catalyst feed, the reactor and resin bed were brought up to the operating temperature of 89° C. and were purged of impurities by circulating nitrogen through the resin bed. Ethylene, butene and hydrogen concentrations were established at 51, 23 and 10%, respectively, Cocatalyst was fed at a rate of 0.3 parts triethylaluminum per part catalyst.

At the time when catalyst was first fed to the reactor, the static voltage in the fluidized bed was −4500 volts. Static voltage was measured in the fluidized bed by monitoring the voltage on a hemispherical steel probe located one inch from the inside wall and one half bed diameter above the distributor plate.

At this time, just subsequent to the initiation of catalyst feed, a saturated mixture of ethanol in nitrogen at 20° C. was fed to the recycle stream just upstream to the inlet to the reactor vessel. The ethanol addition started to reduce the amount of negative static present. The flow of ethanol in nitrogen was controlled to hold the static voltage in the range of ±200 volts. The amount of ethanol required varied between 0.6 and 1.3 ppm ethanol per part ethylene feed to the recycle stream. Eventually, positive static started building in the reactor and the amount of ethanol addition was continuously reduced in order to keep from forming unwanted positive static. Ethanol flow to the reactor was used successfully during the next 3 days to eliminate negative static in response to readings from the static probe. At no time, were there any sheets or fused chunks of polymer found in the product resin withdrawn from the reactor. In addition, reactor operation was smooth and there were no indications of sheet formation.

EXAMPLE 5

The fluidized bed reactor described in Example 4 was again started up at operating conditions designed to produce a film grade low density ethylene copolymer product having a density of 0.918, a melt index of 1.0, and a sticking temperature of 104° C. The reaction was started by feeding catalyst to the reactor precharged with a bed of granular resin similar to the product to be made. The catalyst was the same catalyst as described in Example 4. Prior to starting catalyst feed, the reactor and resin bed were brought up to the operating temperature of 89° C. and were purged of impurities by circulating nitrogen through the resin bed. Ethylene, butene and hydrogen concentrations were established at 49, 22, and 10% respectively. Cocatalyst was fed at a rate of 0.3 parts triethylaluminum per part catalyst.

At the time when catalyst was first fed to the reactor, the static voltage in the fluidized bed was −3500 volts. Static voltage was measured in the fluidized bed by monitoring the voltage on a hemispherical steel probe located one inch from the inside wall and one half bed diameter above the distributor plate.

At this time, just subsequent to the initiation of catalyst feed, a saturated mixture of isopropanol in nitrogen at 30° C. was fed to the recycle stream just upstream of the inlet to the reactor vessel. The isopropanol addition started to reduce the amount of negative static present. The flow of isopropanol in nitrogen was controlled to hold the static voltage in the range of ±200 volts. The amount of isopropanol required varied between 1.1 and 4.1 ppm per part ethylene feed to the recycle stream. Isopropanol was used successfully during the next 2 days to eliminate negative static in response to readings from the static probe. At no time, was any there indication of sheet formation nor any sheets or fused chunks of polymer found in the product resin withdrawn from the reactor. The start up was very smooth while using isopropanol to control negative static.

EXAMPLE 6

Co-polymerization of ethylene and butene was sustained in a fluidized bed reactor. The product copolymer was a film grade resin of 0.918 grams/cm$^3$ and a melt index of 1 dg/min. The catalyst consisted of a mixture of 5 parts titanium trichloride, 1.7 parts aluminum chloride, 8 parts magnesium chloride, and 16 parts tetrahydrofuran deposited on 100 parts of Davison grade 955 silica. The silica had been dehydrated at 600° C. and treated with 5.7 parts triethylaluminum prior to disposition and activated with 32 parts tri-n-hexyl aluminum and 11 parts diethylaluminum chloride subsequent to deposition. The co-catalyst triethylaluminum, was fed at a sufficient rate to maintain molar ratio of Al to Ti of 30 to 1. The fluidized bed was maintained at a temperature of 88° C. Concentrations of ethylene, butene, and hydrogen in the reactor were 46, 16, and 14 mole percent, respectively. Resin was periodically withdrawn from the reactor in order to maintain a constant fluidized bed height within the reactor. Catalyst was fed directly into the fluidized bed and all other feeds were introduced into the cycle gas stream downstream of both the compressor and heat exchanger.

Static voltage was measured in the fluidized bed by monitoring the voltage on a hemispherical steel probe located one inch from the inside wall, and one bed diameter above the distributor plate.

The static voltage in the reactor was steady at +50 volts. At this time a mixture of 10% nitric oxide in nitrogen was fed to the recycle stream just upstream of the inlet to the bottom of the reactor. The nitric oxide addition caused the static voltage to immediately shift positively. It was found that the amount of positive static voltage generated was proportional to the amount of nitric oxide fed to the reactor. A feedrate of 1.9 ppm nitric oxide per part ethylene feed to the reactor caused +4500 volts of static. At voltages above +4000 volts, a temperature excursion to 6° C. above bed temperature was observed using a thermocouple located inside the reactor wall at an elevation of ½ reactor diameter above the gas distributor plate. Experience has shown that such temperature excursions are a positive indication that a sheet of resin was formed in the fluidized bed at this time. The amount of positive static was reduced by reducing the flow rate of nitric oxide to the recycle stream and the temperature indication immediately returned to the normal reading of 86° C., indicating that sheet formation had stopped.

EXAMPLE 7

The fluidized bed reactor used in Example 6 was used to evaluate the effect of oxygen addition upon static voltage. The reactor was operating and the static voltage in the fluidized bed was −600 volts. A mixture of 7.5% oxygen in nitrogen was fed to the recycle piping just upstream of the inlet to the bottom of the reactor vessel. An oxygen feedrate of 0.2 ppm per part ethylene feed to the reactor caused the voltage to be reduced to zero volts. By controlling the feed rate of oxygen to the recycle stream in response to readings from the static probe in the fluidized bed, the static voltage was controlled between ±100 volts. When feed rates above 0.25 ppm oxygen per part ethylene were introduced to the recycle stream, the static voltage began to rise positively. Care was taken in order to keep from overfeeding oxygen and thus causing unwanted positive static. The productivity of the catalyst was unaffected by oxygen addition to the recycle stream in amounts up to 0.25 ppm. By eliminating the negative voltage present in the reactor and controlling the voltage near zero volts using oxygen addition, sheeting did not occur in the reactor.

EXAMPLE 8

The fluidized bed reactor used in Example 6 was further used to examine the effect of acetone on static voltage and sheet formation in the fluidized bed. The static voltage in the reactor was +300 volts. At this time, a stream of nitrogen saturated with acetone at 25° C. was fed to the recycle stream just upstream of the inlet to the bottom of the reactor vessel. An acetone feedrate of 2.9 ppm per part ethylene feed to the reactor caused the voltage to be reduced to zero. Further increases in the acetone feed rate caused unwanted negative static to appear. By controlling the flow rate of acetone to the recycle gas in response to readings from the static probe, the voltage in the fluidized bed could be controlled between positive 50 and negative 50 volts. Care was taken in order to keep from overfeeding acetone and thus causing unwanted negative static. The productivity of the catalyst was unaffected by the use of acetone. No sheets or fused chunks of polymers were found in the product resin removed from the reactor while using acetone to control the static voltage in the reactor. In general, reactor operation was excellent while controlling the static voltage.

EXAMPLE 9

The fluidized bed reactor used and described in Example 6 was further used to examine the effect of methyl isobutyl ketone (MIBK) on static voltage and sheet formation in the reactor. The static voltage in the reactor was +400 volts initially. At this time, a stream of nitrogen saturated with MIBK at 20° C. was fed to the recycle stream just upstream of the inlet to the bottom of the reactor vessel. A MIBK feed rate of 3.4 ppm per part ethylene feed to the reactor caused the voltage to be reduced to zero volts. Further increases in the MIBK feed rate caused negative static to appear. By controlling the flow rate of MIBK to the recycle gas in response to readings from the static probe, the voltage in the fluidized bed could be controlled to within ±50 volts of zero. Care was taken in order to keep from overfeeding MIBK and thus causing unwanted negative static. The productivity of the catalyst was unaffected by the use of MIBK. No indication of sheet formation was found nor were any sheets or chunks found in the product resin removed from the reactor while MIBK was used to control the static voltage level in the fluidized bed.

What is claimed is:

1. A method for reducing sheeting during polymerization of alpha-olefins in a low pressure fluidized bed reactor utilizing titanium or vanadium based compounds as catalysts together with alkyl aluminum cocatalysts which comprises determining the electrostatic levels at the site of possible sheet formations in said reactor; if negative electrostatic levels are indicated then adding a positive charge generating chemical additive to the reactor said additive being selected from the group consisting of alcohols containing up to 7 carbon atoms, oxygen and nitric oxide; if positive electrostatic levels are indicated in said reactor then, adding a negative charge generating chemical additive to the reactor said chemical additive being a ketone containing up to 7 carbon atoms, said positive or negative charge generating chemical additive being added to said reactor as required in an amount sufficient to create and maintain neutral static charges in said reactor.

2. A method according to claim 1 wherein said ketone is acetone.

3. A method according to claim 1 wherein said ketone is methy isobutyl ketone.

4. A method according to claim 1 wherein an alcohol containing up to 7 carbon atoms is added to said reactor when negative electrostatic levels are indicated in said reactor.

5. A method according to claim 4 wherein said alcohol is methanol.

6. A method according to claim 4 wherein said alcohol is ethanol.

7. A method according to claim 4 wherein said alcohol is isopropanol.

8. A method according to claim 1 wherein oxygen is added to said reactor when negative electrostatic levels are indicated in said reactor.

9. A method according to claim 1 wherein nitric oxide is added to said reactor when negative electrostatic levels are indicated in said reactor.

10. A method according to claim 1 wherein said additive is added to said reactor with the monomer feed to said reactor.

11. A method according to claim 1 wherein one of said alpha olefins is ethylene.

12. A method according to claim 1 wherein said chemical additive is added to said reactor in an amount of from about 0.1 to about 25 ppm based on monomer feed.

* * * * *